United States Patent
Schadt et al.

(10) Patent No.: US 9,449,016 B2
(45) Date of Patent: Sep. 20, 2016

(54) DATA SYNCHRONIZATION POLICIES

(75) Inventors: Gyorgy K. Schadt, Redmond, WA (US); John E. Brezak, Woodinville, WA (US); David A. Nichols, Redmond, WA (US); Oded Y. Shekel, Bellevue, WA (US); Albert Hwang, New York, WA (US); Patrick R. Jakubowski, Seattle, WA (US); Ronakkumar N. Desai, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 365 days.

(21) Appl. No.: 13/229,527

(22) Filed: Sep. 9, 2011

(65) Prior Publication Data

US 2013/0064336 A1 Mar. 14, 2013

(51) Int. Cl.
G06F 17/30 (2006.01)

(52) U.S. Cl.
CPC .............................. G06F 17/30176 (2013.01)

(58) Field of Classification Search
CPC ........... G06F 17/30595; G06F 17/067; G06F 17/607; G06F 17/286; G06F 17/194
USPC ........ 707/609, 610, 640, 661, 674, 790, 821
See application file for complete search history.

(56) References Cited

U.S. PATENT DOCUMENTS

| | | | |
|---|---|---|---|
| 6,615,276 B1 * | 9/2003 | Mastrianni et al. ......... 709/250 | |
| 6,671,757 B1 | 12/2003 | Multer et al. | |
| 7,809,682 B2 | 10/2010 | Paterson et al. | |
| 2006/0101064 A1 | 5/2006 | Strong et al. | |
| 2006/0224623 A1 * | 10/2006 | Graziadio | G06F 21/335 |
| 2007/0014314 A1 | 1/2007 | O'Neil | |
| 2007/0112880 A1 | 5/2007 | Yang et al. | |
| 2007/0162517 A1 * | 7/2007 | Teegan | G06F 17/30569 |
| 2009/0030968 A1 * | 1/2009 | Boudreau | H04W 4/08 709/201 |
| 2009/0307715 A1 | 12/2009 | Santamaria et al. | |

OTHER PUBLICATIONS

McKnight, Heath., "Getting the Most out of Cloud Services", Retrieved at <<http://cloud-services-review.toptenreviews.com/getting-the-most-out-of-cloud-services.html>>, Aug. 11, 2011, pp. 2.

* cited by examiner

*Primary Examiner* — Sana Al Hashemi
(74) *Attorney, Agent, or Firm* — Bryan Webster; Dan Choi; Micky Minhas

(57) ABSTRACT

Techniques for data synchronization policies are described. In one or more implementations, techniques may be employed to set data synchronization ("sync") policies for devices in a data sync environment. The sync policies specify parameters for sync operations in the sync environment, such as how frequently data sync operations are performed, what types of data are synced to particular devices, how frequently particular types of data are synced, and so on. In implementations, the sync policies consider the number of devices that are participating in a sync environment and attributes of the devices in specifying parameters for sync operations. Data can be synchronized among devices in the sync environment based on the sync policies.

20 Claims, 9 Drawing Sheets

DATA SYNCHRONIZATION POLICIES

BACKGROUND

Today's online environment enables users to access their data from a variety of different locations and devices. For example, a particular user can have multiple different devices, such as a desktop computer, a laptop, a smartphone, and so on. Data associated with the user can be synchronized among the multiple different devices using a variety of existing techniques. Current synchronization techniques, however, typically do not consider the attributes of a sync environment as a whole in setting parameters for data sync operations. Further, existing techniques are typically agnostic to the types of data that are being synced to various devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for data synchronization policies are described. In one or more implementations, techniques may be employed to set data synchronization ("sync") policies for devices in a data sync environment. The sync policies specify parameters for data sync operations in the sync environment, such as how frequently data sync operations are performed, what types of data are synced to particular devices, how frequently particular types of data are synced, and so on. In implementations, the sync policies consider the number of devices that are participating in a sync environment and attributes of the devices in specifying parameters for sync operations. Data can be synchronized among devices in the sync environment based on the sync policies.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for data synchronization policies are described. In one or more implementations, techniques may be employed to set data synchronization ("sync") policies for devices in a data sync environment. The sync policies specify parameters for data sync operations in the sync environment, such as how frequently data sync operations are performed, what types of data are synced to particular devices, how frequently particular types of data are synced, and so on. In implementations, the sync policies consider the number of devices that are participating in a sync environment and attributes of the devices in specifying parameters for sync operations. Data can be synchronized among devices in the sync environment based on the sync policies.

In the following discussion, an example environment is first described that is operable to employ techniques for data synchronization policies described herein. Next, a section entitled "Example Sync Policies" describes example sync policies that can be employed to coordinate data sync operations between devices. Following this, a section entitled "Sync Policy Aggregation" describes embodiments in which sync policies are aggregated for devices in a sync environment. Next, a section entitled "Sync Notifications" describes embodiments in which devices are notified of changes in a sync environment. Following this, a section entitled "Sync Policy Updates" describes embodiments in which updates to sync policies are propagated to devices. Next, a section entitled "Data Cleanup" describes embodiments in which data that is not being synced can be deleted. Last, a section entitled "Example System and Device" describes aspects of an example system and an example device that can be utilized to implement one or more embodiments.

Example Environment

Figure 1:
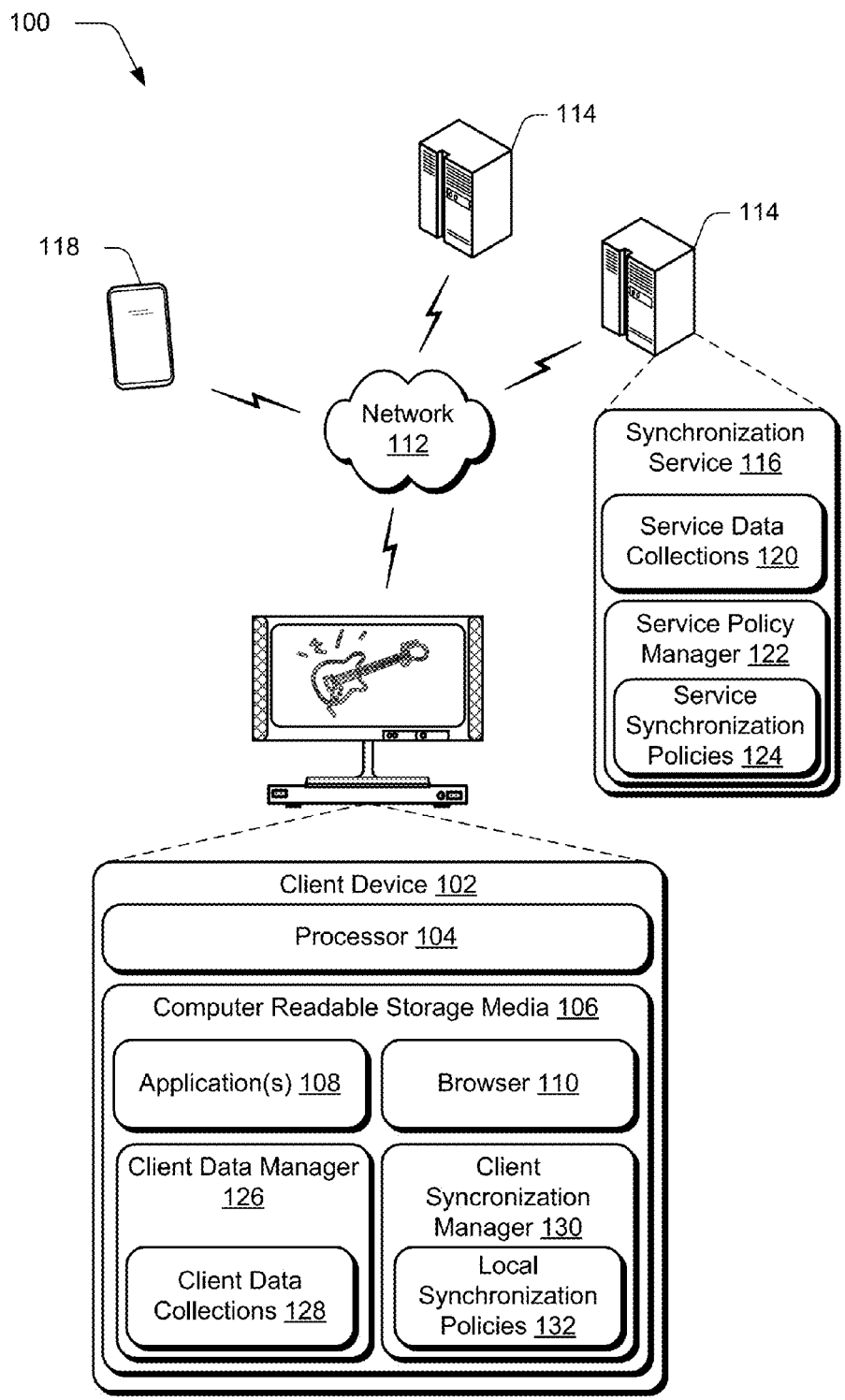
FIG. 1 is an illustration of an environment in an example implementation that is operable to employ techniques for data synchronization policies.

FIG. 1 is an illustration of an environment 100 in an example implementation that is operable to employ techniques for data synchronization policies. Environment 100 includes a client device 102 having one or more processors 104, one or more computer-readable storage media 106, and one or more applications 108 that reside on the computer-readable storage media 106 and which are executable by the processor 104. Client device 102 can be embodied as any suitable computing device such as, by way of example and not limitation, a desktop computer, a portable computer, a handheld computer such as a personal digital assistant (PDA), mobile phone, tablet computer, and the like. One of a variety of different examples of a client device 102 is shown and described below in FIGS. 9 and 10. The applications 108 are representative of functionalities that enable tasks to be performed via the client device 102, such as word processing, email, spreadsheet, media content consumption, and so on.

The client device 102 of FIG. 1 is also illustrated as including a browser 110, e.g., a web browser, which is representative of functionality that is configured to navigate via a network 112. Although the network 112 is illustrated as the Internet, the network may assume a wide variety of configurations. For example, the network 112 may include a wide area network (WAN), a local area network (LAN), a wireless network, a public telephone network, an intranet, and so on. Further, although a single network 112 is shown, the network 112 may be configured to include multiple networks.

The browser 110, for instance, may be configured to navigate via the network 112 to interact with data available from one or more web resources 114 as well as communicate data to the one or more web resources 114, e.g., perform downloads and uploads. The web resources 114 may include any suitable computing resource that is configured to provide data and/or content that is accessible via the network 112.

The environment 100 further includes a synchronization ("sync") service 116, which is representative of functionality to synchronize data among multiple devices. For example, the sync service 116 can synchronize data between the client device 102 and a different client device 118 included as part of the environment 100. In implementations, the client device 102 and the different client device 118 can be registered to a particular user, and thus the sync service 116 can enable data associated with the user to be synchronized between the devices.

Further to implementing techniques discussed herein, the sync service 116 can receive data from the client device 102 and/or the different client device 118, categorize the data as belonging to a particular category of data, and store the data via service data collections 120. The service data collections 120 are representative of functionality to store data according to a variety of different categories of data. For example, the service data collections 120 include multiple collections of data that each correspond to a particular category of data. Example data categories include personal data, enterprise data, media content (e.g., images, video, audio, and so on), news content, contacts, appointments, device settings, and so on. Thus, user data can be categorized via the service data collections 120 to enable data of interest to a particular user and/or device to be retrieved.

The sync service 116 further includes a service policy manager 122, which is representative of functionality to manage service synchronization policies 124 for the sync service 116. The service synchronization policies 124 specify data synchronization parameters for data synchronization operations between the sync service 116, the client device 102, and the different client device 118. Data synchronization policies and parameters are discussed in more detail below.

The client device 102 further includes a client data manager 126, which is representative of functionality to manage client data collections 128. In implementations, the client data manager 126 organizes data that is received via the client device 102 by categorizing the data into specific collections of the client data collections 128. The data can include data that is entered by a user and/or data that is received from another device, e.g., from the sync service 116 as part of a synchronization operation. Further, one or more of the client data collections 128 can have a corresponding data collection in the service data collections 120. Thus, data can be synchronized between discrete data collections of the client data collections 128 and corresponding data collections of the service data collections 120.

Further included as part of the client device 102 is a client synchronization ("sync") manager 130, which is representative of functionality to coordinate synchronization operations for the client device 102. The client sync manager 130 maintains client synchronization ("sync") policies 132, which specify data sync parameters for syncing data between the client device 102 and other entities, such as the sync service 116 and/or the different client device 118. The client sync manager 130 can also update the client sync policies 132 by syncing the client sync policies with the service sync policies 124. For example, the client sync policies 132 can specify that the client sync policies be periodically synced to the service sync policies 124, such that changes to the service sync policies can be propagated to the client sync policies, and vice-versa.

Generally, any of the functions described herein can be implemented using software, firmware, hardware (e.g., fixed logic circuitry), or a combination of these implementations. The terms "manager," "module," "functionality," and "logic" as used herein generally represent software, firmware, hardware, or a combination thereof. In the case of a software implementation, the manager, module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the client device 102 may also include an entity (e.g., software) that causes hardware of the client device 102 to perform operations, e.g., processors, functional blocks, and so on. For example, the client device 102 may include a computer-readable medium that may be configured to maintain instructions that cause the computing device, and more particularly hardware of the client device 102 to perform operations. Thus, the instructions function to configure the hardware to perform the operations and in this way result in transformation of the hardware to perform functions. The instructions may be provided by the computer-readable medium to the client device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Discussed below are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the aspects of the methods can be implemented via interaction between various entities discussed above with reference to the environment 100 and below with reference to the system 900.

Having described an example environment in which the techniques described herein may operate, consider now a discussion of some example sync policies in accordance with one or more embodiments.

Example Sync Policies

Discussed below are a number of example sync policies that can be employed to coordinate data sync operations between devices. The example sync policies are presented for purposes of illustration only, and the claimed embodiments encompass a wide variety of different sync policies not expressly discussed herein.

Sync Participants

The frequency of data sync operations can change based on the number of sync participants available to participate in a sync environment. Examples of sync participants include devices, applications, web-based entities (e.g., a web page), and so on. For example, if the client device 102 is the only client active in the environment 100, data can be synced less frequently from the client device 102 to the sync service 116. If additional devices activate into the sync environment (e.g., the different client device 118), data sync operations can be performed more frequently.

As another example, sync frequency can be affected by applications running on a device, e.g., a local application, a web application, and so on. For instance, the application 108 can be registered as being interested in syncing data, e.g., using registration techniques discussed herein. When the application is launched on the client device 102, the frequency of data sync operations can be increased in response. Further, when the application closes or stops executing on the device, the frequency of sync operations can be decreased.

Thus, a particular sync policy can specify that the frequency of data sync operations corresponds to the number of participating entities that are available at a particular time to participate in a sync operation.

Device Type

The frequency of data sync operations can also change based on the types of devices participating in a sync environment. For example, if one or more devices that are active in a sync environment are mobile devices operating under battery power, data sync operations can be performed less frequently to conserve battery resources. If the devices in a sync environment are operating under and/or connected to alternating current (AC) power, data sync operations can be performed more frequently.

Data Type

The type of data available to be synced can also affect how frequently data sync operations are performed. Certain types of data can be more relevant to particular devices and/or classes of devices, whereas other types of data may be less relevant. For example, a change to a device setting at a desktop computer may not be particularly relevant to a mobile device, and thus data associated with the change can be synced to a mobile device less frequently. A change to a contacts list, a favorite websites list, and/or a calendar, however, may be considered relevant to various different devices, and thus can be synced more frequently.

As another example, data associated with particular applications can be of interest to devices on which the applications are installed and/or devices that interact with the applications. For example, consider a scenario with a game application that is installed on a device. Game data associated with the game application can be of interest to the device, such as saved games, game settings, high scores, and so on. For example, game data can be determined to be of interest to the device and other devices by virtue of the game application be installed on the devices. In such cases, game data can be marked as data of interest and can be synced to the devices more frequently.

As discussed above, data can be categorized and stored in discrete collections of data. Thus, some collections of data can be designated as "high interest" collections such that data from the particular collections is synced more frequently than data from other collections. Further, a user can specify which collections of data the user is interested in, and how often the data from the collections of interest is to be synced. Further details concerning user selection of data of interest are presented below.

Thus, sync policies can specify how frequently certain types of data are to be synced. Further, the frequency with which specific types of data are synced can be specified by a user and/or some other entity associated with the sync operations.

Network Resources

Attributes of networks that are available to communicate data for a sync operation may also be considered in determining when and/or how frequently data sync operations are to be performed. Such attributes can include available network bandwidth, a service provider associated with a network, data security features of a network, and so on.

For instance, if available data transmission bandwidth for a network falls below a threshold bandwidth, data sync operations can be performed less frequently to conserve bandwidth resource. The threshold bandwidth can be a default value associated with a particular sync service and/or specific to a particular network. In implementations, if increased bandwidth becomes available, the frequency of data sync operations can be increased.

A further attribute that can be considered is a service provider associated with a network. For example, a user can register an account with a particular service provider (e.g., a cell phone service) to provide data communication for a device. Thus, when the user's device is connected to a network associated with the service provider, the user will be charged for data transmission based on the terms of the user's service agreement with the service provider. If the user's device connects to a different network associated with a different service provider (e.g., roams to another network), the user can incur additional charges for data transmission via the different network. Thus, sync policies can specify that if a device is connected to a network outside of its registered service provider network, the frequency of sync operations will decrease. This can minimize additional costs that may be incurred when transmitting data in a network roaming scenario.

Data Allotments

In certain scenarios, a user and/or a device can be allotted a certain amount of data that may be transmitted and/or received over a specific period of time. For example, a service provider can specify data bandwidth limits for a user, e.g., n gigabytes of data transfer per day, per week, per month, and so on. If the user exceeds their data allotment, the user may be subject to restrictions and/or additional charges for further data transfer.

Accordingly, sync policies can consider such data allotments in determining how frequently data sync operations may occur. For example, a particular policy can indicate a threshold bandwidth usage relative to a user's data allotment, e.g., 90% of the user's allotment. If the user's data bandwidth usage exceeds the threshold, the frequency with which data sync operations are performed can be decreased. If the user's data bandwidth usage subsequently meets and/or falls below the threshold, the frequency with which data sync operations are performed can be increased.

In at least some implementations, a data sync service can enforce limits on the amount of data that can be synced during a particular sync operation and/or over a specific period of time. For example, a sync service can specify that for a particular user or class of users, a sync operation is limited to n megabytes of data transfer. If the amount of data scheduled for a particular sync operation exceeds this data limit, portions of the data may be queued for a subsequent sync operation such that the particular sync operation stays within the data limit. Alternatively, additional usage fees may be applied for portions of data that exceed a data limit during a particular sync operation.

In implementations, data allotments can also be based on storage resources dedicated to a particular data collection. For example, a data collection can be allotted a threshold amount of data storage space, e.g., at a sync service. If a data collection reaches a threshold amount, additional data may be prevented from being stored in the data collection, or data may be aged out of the data collection. In such implementations, high interest data collections can be allotted higher storage capacities than lower interest data collections.

A sync service can also provide for different service levels for data syncing, such as a standard service level, a premium service level, and so on. The premium service level can be made available to users at a higher cost than the standard service level. Subscribing to the premium service level can provide a user with higher data bandwidth allotments (e.g., for a particular sync operation) and/or entitle the user to more frequent sync operations than does the standard service level. Additionally or alternatively, a user at the premium service level can have a higher data storage allotment (e.g., at the sync service 116) than a user at the standard service level.

Different levels of service can also be provided based on a number of devices associated with a particular user. For example, a user with more devices that participate in a sync environment can pay more for their sync service than does a user with fewer devices. Thus, the user with more devices can be entitled to increased levels of service than the user with fewer devices, such as discussed with respect to the premium service level mentioned above.

Having discussed some example sync policies, consider now a discussion of sync policy aggregation in accordance with one or more embodiments.

Sync Policy Aggregation

Sync operations for a particular device and/or sync environment can be performed based on a variety of different sync policies, examples of which are discussed above and below.

Figure 2:
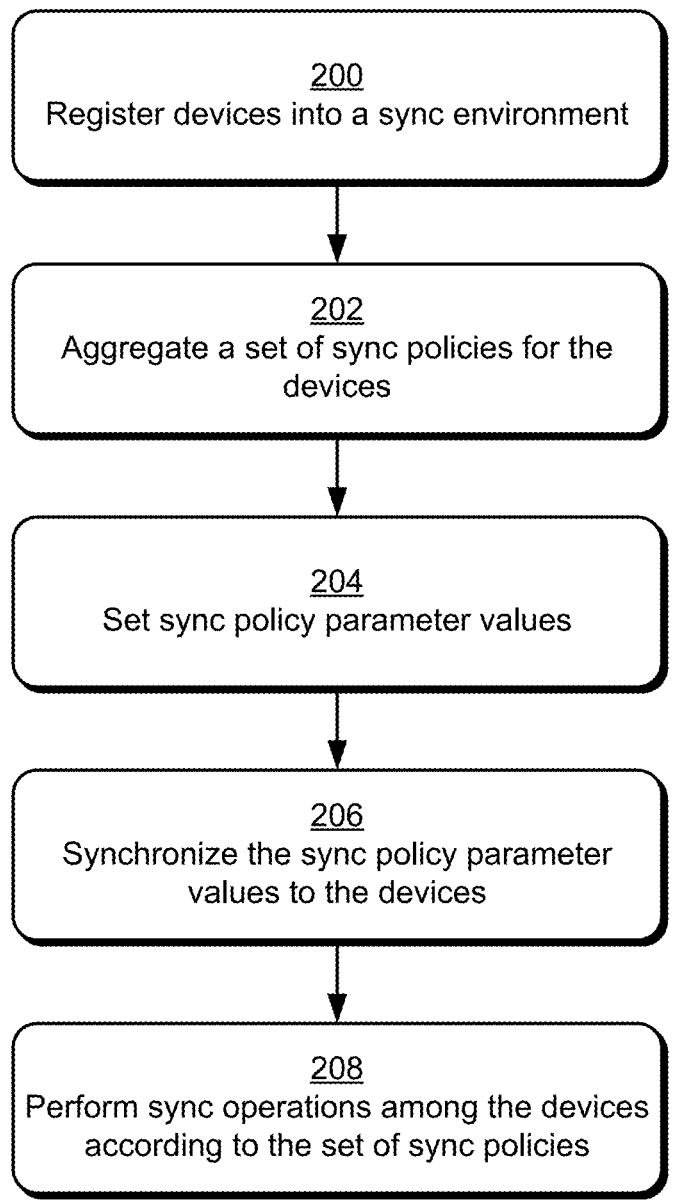
FIG. 2 is a flow diagram that describes steps in a method in accordance with one or more embodiments.

FIG. 2 is a flow diagram that describes steps in a method in accordance with one or more embodiments. Step 200 registers devices into a sync environment. In some implementations, a user profile can be created (e.g., with the sync service 116) that associates multiple devices with a particular user and/or group of users. Other implementations, however, can use different techniques for associating devices together in a sync environment. For example, a password or other access mechanism can be specified for a particular device. Other devices that are to participate in sync operations with the device would provide the password. Further details regarding device registration are discussed below.

Step 202 aggregates a set of sync policies for the devices. For example, the sync service 116 can aggregate the set of sync policies for the devices. The sync policies can be based at least partially on information received during device registration, as well as other sync policy considerations discussed elsewhere herein. The sync policies can be propagated to the devices, e.g., to the client sync policies 132.

Step 204 sets sync policy parameter values. Examples of sync policy parameter values include sync frequency for particular devices, data of interest to particular devices, service levels for particular devices, and so on. Step 206 synchronizes the sync policy parameter values to the devices. For example, the sync policies and their respective parameter values can be propagated from a sync service to one or more devices. Step 208 performs sync operations according to the set of sync policies.

Figure 3:
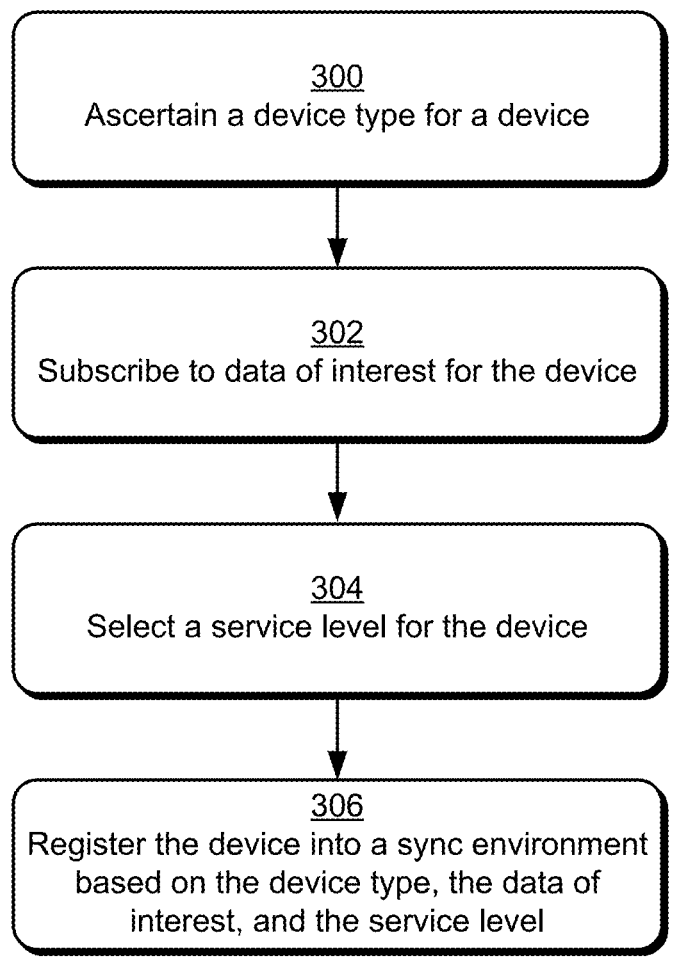
FIG. 3 is a flow diagram that describes steps in a method in accordance with one or more embodiments.

FIG. 3 is a flow diagram that describes steps in a method in accordance with one or more embodiments. In implementations, the method can be employed to register devices into a sync environment, e.g., as part of step 200 discussed above with reference to FIG. 2.

Step 300 ascertains a device type for a device. The device type can be determined by querying a user and/or a functionality of the device (e.g., an operating system) for a device type. The device type can include various classes and/or form factors of devices, such as a desktop PC, a laptop, a mobile phone, and so on.

Step 302 subscribes to data of interest for the device. For example, a user can select particular data types and/or categories of data that the user is interested in syncing to the user's devices. Additionally or alternatively, data of interest can be determined based on a correlation between attributes of a device and particular types of data. For example, if the device has a particular application installed, data associated with that application can be synced to the device. Also, data that is specific to one class of devices (e.g., mobile devices) may not be particularly relevant to a different class of devices (e.g., desktop computers), and thus may not be synced to devices of the different class. Further aspects of data subscription are discussed below.

Step 304 selects a service level for the device. For example, a user can select a standard service level, a premium service level, and so on. Features of different service levels are described above. Step 306 registers the device into a sync environment based on the device type, the data of interest, and the service level. The device can participate in sync operations based on the information provided during registration, as discussed in more detail above and below.

In implementations, device registration with a sync service can be associated with a registration period that is renewable. If a registration for a device is not renewed before the expiration of the registration period, the device's registration can expire such that the device will no longer participate in sync operations in a particular sync environment. When a device's registration expires, a user can re-register the device to initiate syncing data to the device. Additionally or alternatively, a device can be automatically re-registered, such as via re-activating a device that was previously registered.

Figure 4:
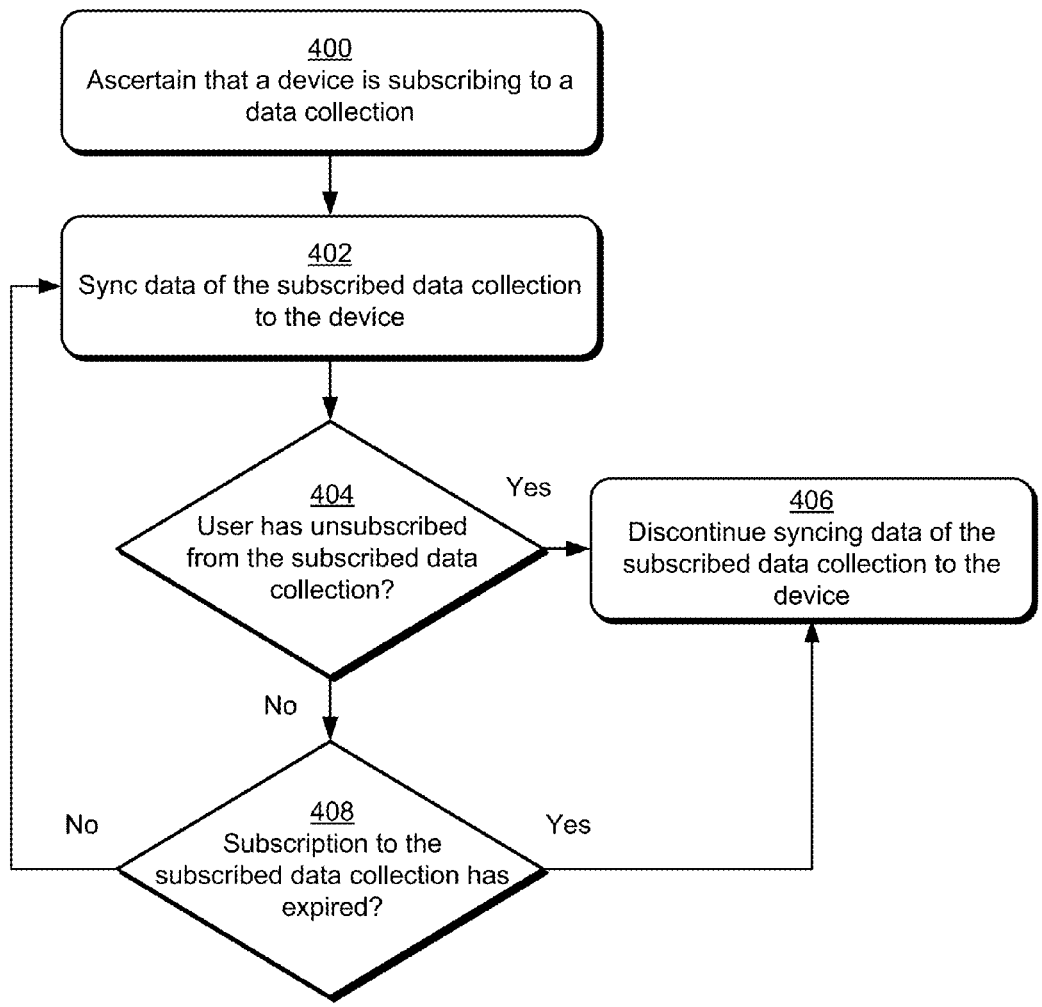
FIG. 4 is a flow diagram that describes steps in a method in accordance with one or more embodiments.

FIG. 4 is a flow diagram that describes steps in a method in accordance with one or more embodiments. Step 400 ascertains that a device is subscribing to a data collection. For example, a graphical user interface can be presented that enables a user to selection particular data types and/or categories of data that are to be synced to various devices. One example of such a graphical user interface is described below. Step 402 syncs data of the subscribed data collection to the device. The data can be synced according to a set of sync policies associated with a sync environment.

Step 404 determines whether a user has unsubscribed from the subscribed data collection. If the user has unsubscribed from the selected data category ("Yes"), step 406 discontinues syncing data of the subscribed data collection to the device. If the user has not unsubscribed from the selected data type ("No"), step 408 ascertains whether a subscription to the subscribed data collection has expired. In implementations, a subscription to a particular data collection can have a subscription period (e.g., in days, weeks, months, and so on) such that the subscription can expire after the subscription period. A user can re-subscribe to a data collection, either before or after the expiration of a subscription period, to cause the subscription to be renewed.

If the subscription to the selected data collection has not expired ("No"), step 402 syncs data of the subscribed data collection to the device. If the subscription to the selected data collection has expired ("Yes"), step 406 discontinues syncing data of the subscribed data collection to the device. In implementations, a notification can be presented to a user that a subscription is about to expire. The user can renew the subscription, either via the notification or some other suitable technique.

Figure 5:
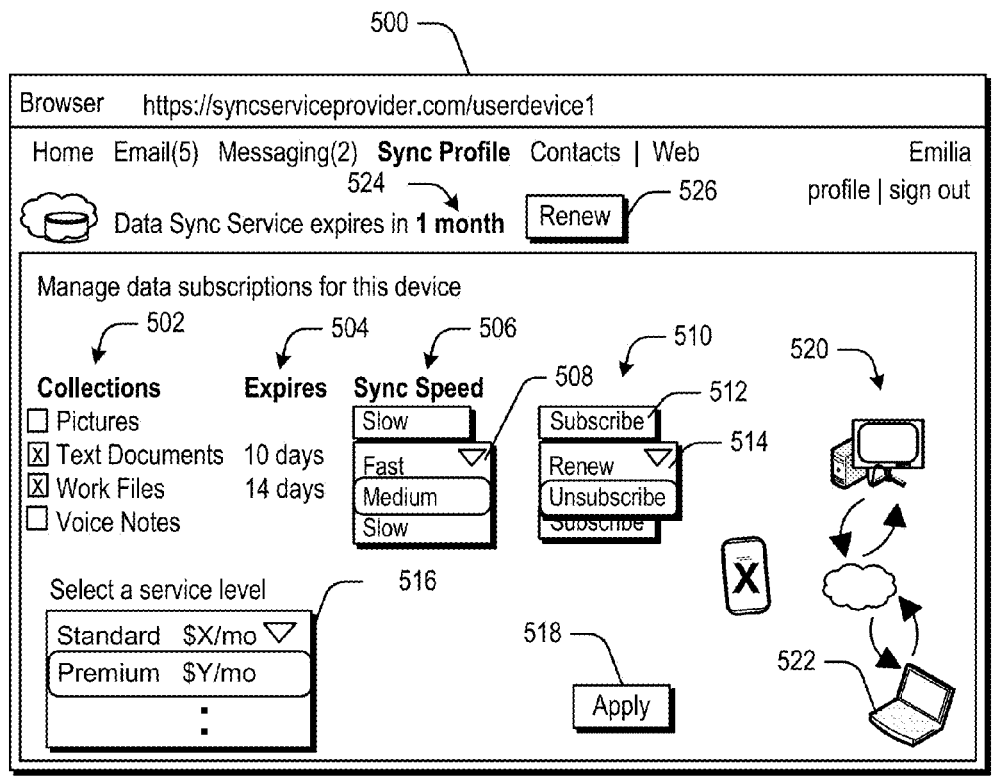
FIG. 5 illustrates an example sync user interface in accordance with one or more embodiments.

FIG. 5 illustrates a sync user interface 500 in accordance with one or more embodiments. The sync user interface 500 can be displayed via a device (e.g., the client device 102) to enable a user to configure data sync parameters, e.g., as part of a device registration. In implementations, the sync user interface 500 can be included as part of a website hosted by a sync service, and thus can be displayed as part of a webpage.

The sync user interface 500 includes several regions that enable a user to specify data sync parameters and view data sync information. These regions include a data collections region 502, an expiration region 504, and a sync speed region 506. The data collections region 502 lists different data collections that can be synced to a device. The listed data collections are presented for purposes of illustration only, and various embodiments can include any suitable type and/or category of data.

The expiration region 504 indicates expiration periods for sync subscriptions to the different data collections. A data collection can have a specific subscription period, during which data from the collection is synced to a device or group of devices. If the subscription period expires for a device, data from the collection can discontinue being synced to the device.

The sync speed region 506 indicates a frequency with which data from particular data collections is synced. For example, data from high interest collections can be synced more frequency than data from lower interest categories. This can enable a user to control data bandwidth usage to avoid exceeding bandwidth limits associated with a sync service account. A sync speed menu 508 enables a user to select from different sync frequencies for the data collections.

The sync user interface 500 further includes an action region 510, which includes several visual indicia that enable a user to perform different actions with respect to data collections. For example, a subscribe control 512 can be selected to subscribe to a data collection, e.g., the "Pictures" data collection. A subscription menu 514 provides different subscription options for data collections. For example, a user can select a "Renew" option to renew a subscription to a data collection, e.g., the "Text Documents" data collection. Renewing a subscription to a data collection can reset the sync expiration period to a user-specified or default expiration period. Alternatively, a user can select an "Unsubscribe" option from the subscription menu 514 to unsubscribe from a data collection, e.g., to discontinue syncing data from the data collection to a device.

The sync user interface 500 further includes a service level menu 516, which can enable a user to select from various types and/or levels of sync service. Example features of different sync service levels are discussed above. An apply control 518 is also included as part of the sync user interface 500. The apply control 518 is selectable to apply various settings indicated in the sync user interface 500 to a particular sync profile, such as subscriptions to data collections, selected service levels, and so on.

Further included as part of the sync user interface 500 is a status region 520 that can display various notifications regarding a sync environment. For example, the status region 520 can include a connectivity status for various devices, and can also include visual indications of active and/or pending sync operations. The status region can also display visual representations of different devices that can participate in a sync environment, such as devices that are registered to a particular user.

Further to such embodiments, the status region 520 includes a device icon 522 that is selectable to cause various information about a device to be displayed via the sync user interface 500, such as sync settings for the device. For example, consider a scenario where the sync user interface 500 is displayed via a particular device, and the device icon 522 corresponds to a different device. Further to this scenario, the device icon 522 can be selected to cause sync settings for the different device to be displayed and enable a user to specify and apply sync settings for the different device. For example, a user can subscribe to data collections and/or renew data collection subscriptions for the different device. Thus, the sync user interface 500 can provide an integrated way of configuring data sync parameters for multiple devices via a single device.

The sync user interface 500 further includes a device registration region 524 that indicates a sync service registration period for a device. As mentioned above, a device can be associated with a renewable registration period. If the registration period is not renewed before it expires, a device can be unregistered from a sync service such that data is not synced via the sync service to the device. Thus, a registration renewal control 526 is provided that, if selected, can renew a device registration period for a device.

Sync Notifications

Changes in a sync environment can affect aspects of sync operations. For example, if a device activates into a sync environment, the frequency of sync operations can be increased for devices in the sync environment. Thus, notifications can be used to notify devices of changes in a sync environment.

Figure 6:
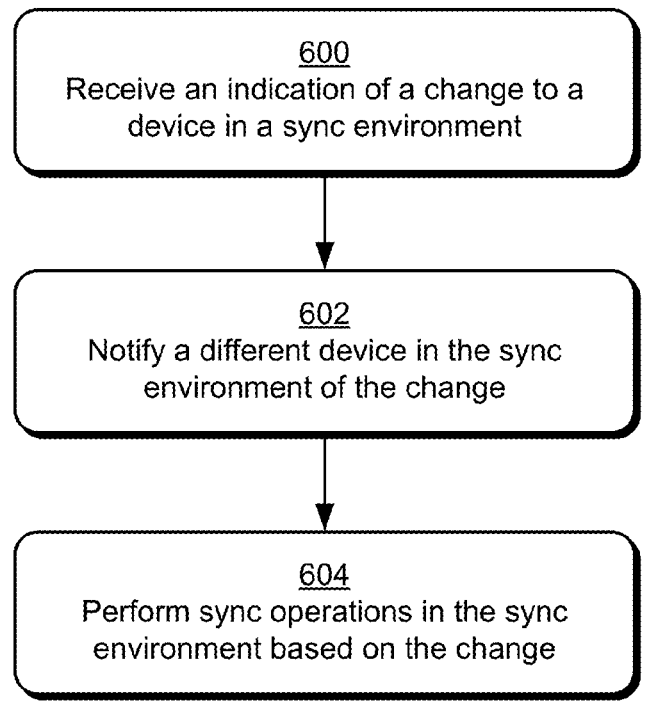
FIG. 6 is a flow diagram that describes steps in a method in accordance with one or more embodiments.

FIG. 6 is a flow diagram that describes steps in a method in accordance with one or more embodiments. Step 600 receives an indication of a change to a device in a sync environment. For example, the sync service 116 can receive an indication that a device has activated into the environment 100. The indication can be in response to a user registering a device with the sync service 116, a registered device powering on and connecting to the sync service, a registered device powering off and disconnecting from the sync service, and so on. As another example, the change can include a change to a data collection, e.g., data that has been changed or added in one of the service data collections 120.

As yet another example, the change can correspond to a change in device location. For example, a user can travel to a different geographic location. Thus, the change can include an indication of the different geographic location, such as global positioning system (GPS) coordinates, a street address, a business entity associated with the different location, and so on.

Step 602 notifies a different device in the sync environment of the change. For example, the change can be with respect to a particular device in the sync environment. Other devices in the sync environment can be notified of the change to the particular device, e.g., by the sync service 116.

Step 604 performs sync operations in the sync environment based on the change. For example, devices in the sync environment can adjust values for their respective sync policies, and sync operations can be performed based on the adjusted sync policies.

Sync Policy Updates

Changes in a sync policy can affect aspects of sync operations. For example, a user can upgrade their sync account, such as from a standard service level to a premium service level. Based on the upgrade, the user may be entitled to more frequent sync operations and/or a larger data allotment per sync operation. Thus, a sync policy can be updated to specify that sync operations are to be performed more frequently and/or that more data may be transmitted during a sync operation.

Figure 7:
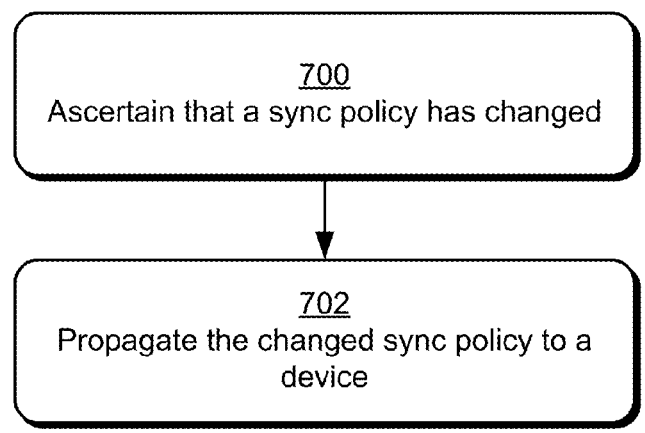
FIG. 7 is a flow diagram that describes steps in a method in accordance with one or more embodiments.

FIG. 7 is a flow diagram that describes steps in a method in accordance with one or more embodiments. Step 700 ascertains that a sync policy has changed. For example, the sync service 116 can cause one of the service sync policies 124 to be changed based on a user action, such as registering a new device, changing a service level, changing a sync operation parameter, and so on. Additionally or alternatively, the sync service 116 can initiate a change to a sync policy. For example, a service provider or other entity that operates the sync service can change the terms of the sync service, such as how frequently sync operations may be performed at a given service level, how much data may be transferred during a sync operation, and so forth.

Step 702 propagates the changed sync policy to a device. For example, the sync service 116 can notify a device that an updated sync policy is available. The device can retrieve the updated sync policy and incorporate it into its client sync policies. Additionally or alternatively, the updated sync policy can be pushed from the sync service to the device.

In implementations, a device can be configured to periodically check for updated sync policies. For example, a client sync policy can specify that a device is to query a sync service on a periodic basis for updated sync policies. In response to such a query, the sync service can return an updated sync policy to the device.

Data Cleanup

Maintaining data in collections provides a convenient way of enabling devices to obtain data of interest. When no devices are subscribing to a particular collection, however, the collection can be deleted to free up storage resources.

Figure 8:
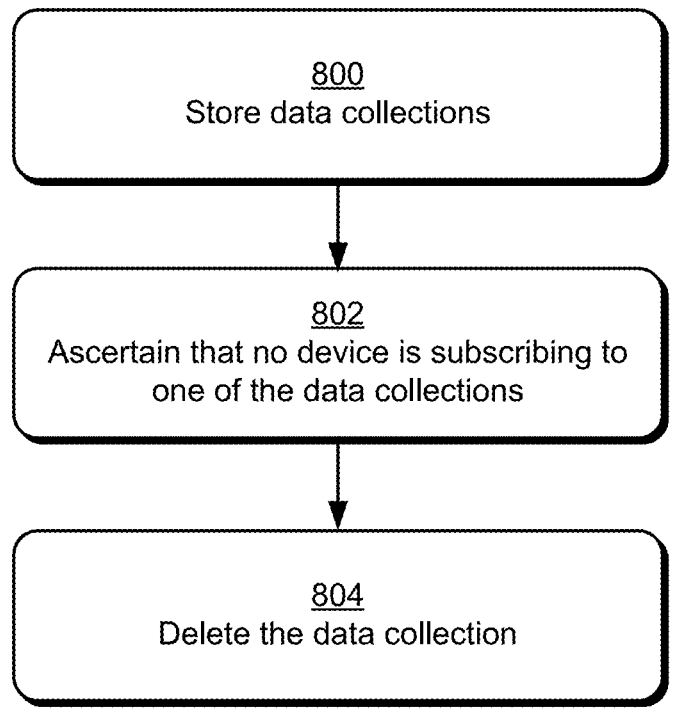
FIG. 8 is a flow diagram that describes steps in a method in accordance with one or more embodiments.

FIG. 8 is a flow diagram that describes steps in a method in accordance with one or more embodiments. Step 800 stores data collections. As discussed above, the sync service 116 stores the service data collections 120. A device can subscribe to one of the service data collections 120 to cause the data collection to be synced to the device.

Step 802 ascertains that no device is subscribing to one of the data collections. For example, no device may have subscribed to the data collection, or subscriptions to the data collection may have expired. Step 804 deletes the data collection. For example, storage space used to store the data collection can be made available to store other data. If subscriptions to the data collection have expired, the data collection can be deleted after a certain amount of time has elapsed since the expiration.

In implementations, a user can be notified that a data collection is about to be deleted and given an opportunity to prevent the data collection from being deleted. For example, the sync user interface 500 can be presented to the user with a notification that a particular data collection will be deleted after a certain amount of time. The user can subscribe a device to the data collection, which can prevent the data collection from being deleted. Alternatively, the user can take no action with respect to the data collection, and the data collection can be deleted.

Example System and Device

Figure 9:
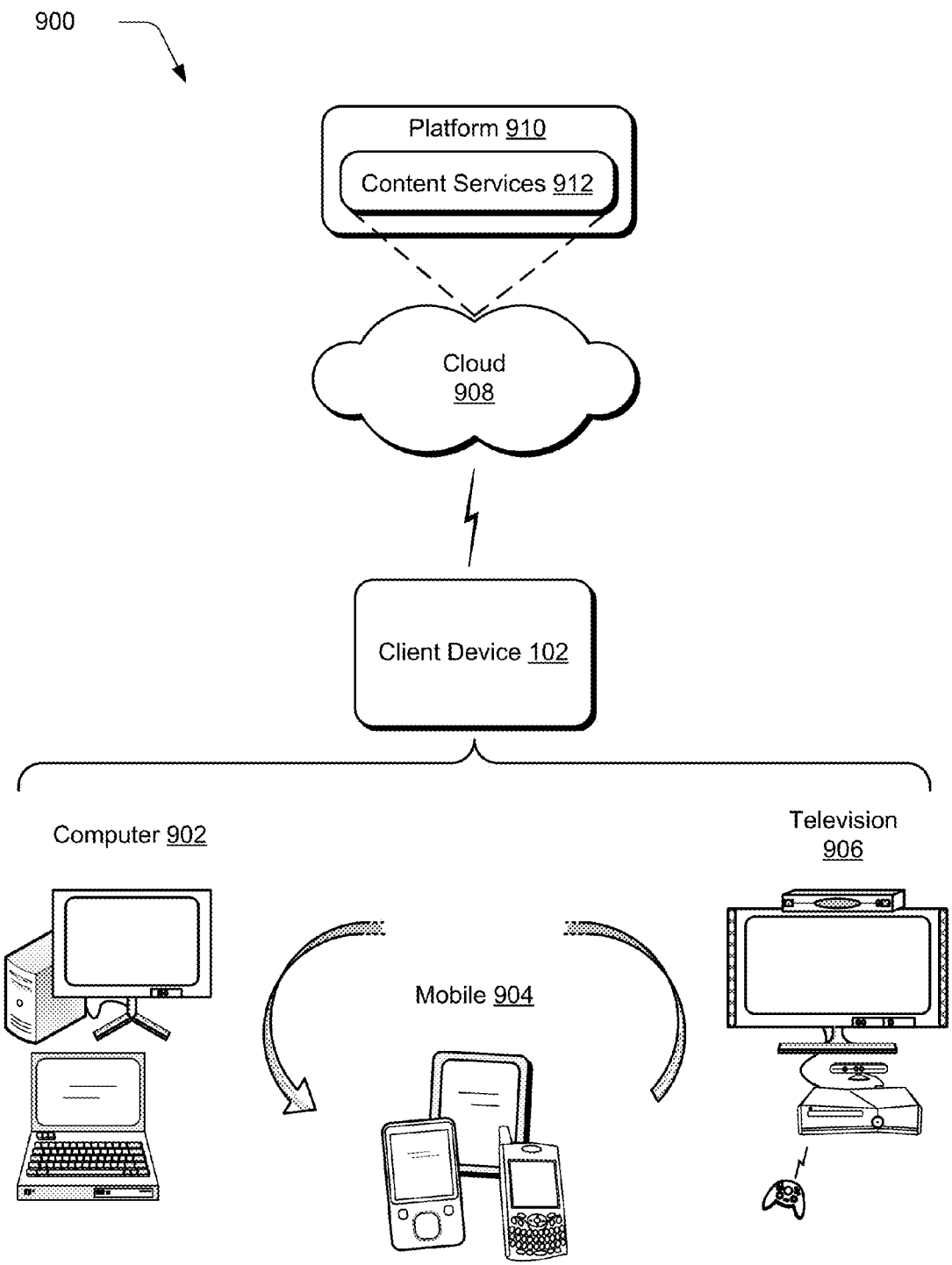
FIG. 9 illustrates an example system that includes a client device as described with reference to FIGS. 1 and 10.

FIG. 9 illustrates an example system 900 showing the client device 102 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the client device 102 may be configured in a variety of different ways, such as for mobile 902, computer 904, and television 906 uses. Each of these configurations has a generally corresponding screen size and thus the client device 102 may be configured as one of these device classes in this example system 900. For instance, the client device 102 may assume the mobile 902 class of device which includes mobile telephones, music players, game devices, and so on.

The client device 102 may also assume a computer 904 class of device that includes personal computers, laptop computers, netbooks, and so on. The television 906 configuration includes configurations of device that involve display in a casual environment, e.g., televisions, set-top boxes, game consoles, and so on. Thus, techniques described herein may be supported by these various configurations of the client device 102 and are not limited to the specific examples described in the following sections.

Cloud 908 is illustrated as including a platform 910 for web services 912. The platform 910 abstracts underlying functionality of hardware (e.g., servers) and software resources of the cloud 908 and thus may act as a "cloud operating system." For example, the platform 910 may abstract resources to connect the client device 102 with other computing devices. The platform 910 may also serve to abstract scaling of resources to provide a corresponding level of scale to encountered demand for the web services 912 that are implemented via the platform 910. A variety of other examples are also contemplated, such as load balancing of servers in a server farm, protection against malicious parties (e.g., spam, viruses, and other malware), and so on.

Thus, the cloud 908 is included as a part of the strategy that pertains to software and hardware resources that are made available to the client device 102 via the Internet or other networks. For example, techniques for data synchronization policies discussed herein may be implemented in part on the client device 102 as well as via the platform 910 that supports web services 912.

In implementations, input to the client device 102 may be detected using touchscreen functionality in the mobile configuration 902, track pad functionality of the computer 904 configuration, detected by a camera as part of support of a natural user interface (NUI) that does not involve contact with a specific input device, and so on. Further, performance of the operations to implement techniques discussed herein may be distributed throughout the system 900, such as by the client device 102 and/or the web services 912 supported by the platform 910 of the cloud 908.

Figure 10:
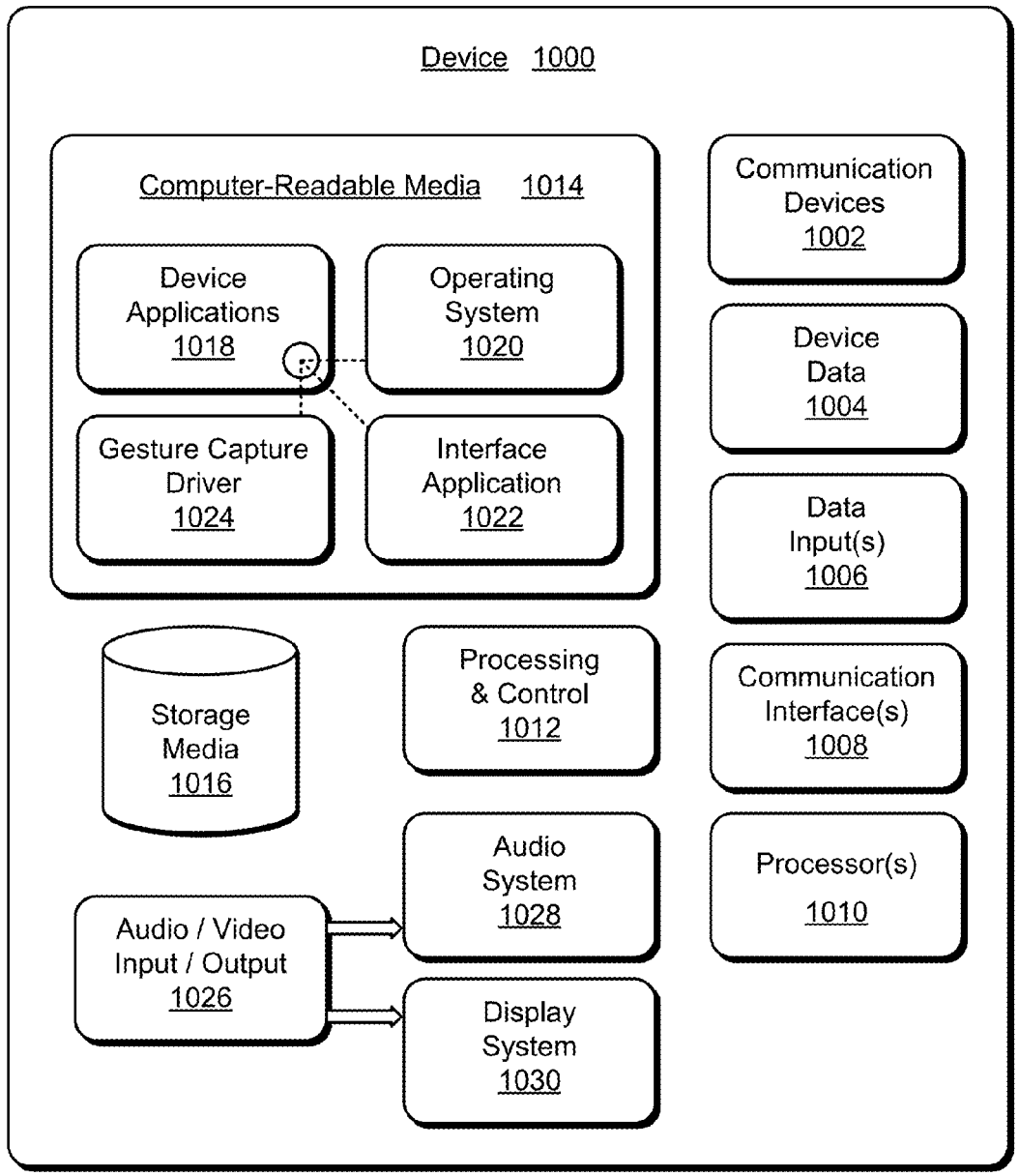
FIG. 10 illustrates an example computing device that can be utilized to implement various embodiments described herein.

FIG. 10 illustrates various components of an example device 1000 that can be implemented as any type of portable and/or computer device as described with reference to FIGS. 1 and 9 to implement embodiments of the techniques for data synchronization policies described herein. Device 1000 includes communication devices 1002 that enable wired and/or wireless communication of device data 1004 (e.g., received data, data that is being received, data scheduled for broadcast, data packets of the data, etc.). The device data 1004 or other device content can include configuration settings of the device, media content stored on the device, and/or information associated with a user of the device. Media content stored on device 1000 can include any type of audio, video, and/or image data. Device 1000 includes one or more data inputs 1006 via which any type of data, media content, and/or inputs can be received, such as user-selectable inputs, messages, music, television media content, recorded video content, and any other type of audio, video, and/or image data received from any content and/or data source.

Device 1000 also includes communication interfaces 1008 that can be implemented as any one or more of a serial and/or parallel interface, a wireless interface, any type of network interface, a modem, and as any other type of communication interface. The communication interfaces 1008 provide a connection and/or communication links between device 1000 and a communication network by which other electronic, computing, and communication devices communicate data with device 1000.

Device 1000 includes one or more processors 1010 (e.g., any of microprocessors, controllers, and the like) which process various computer-executable or readable instructions to control the operation of device 1000 and to implement the data synchronization embodiments described above. Alternatively or in addition, device 1000 can be implemented with any one or combination of hardware, firmware, or fixed logic circuitry that is implemented in connection with processing and control circuits which are generally identified at 1012. Although not shown, device 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1000 also includes computer-readable media 1014, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1000 can also include a mass storage media device 1016.

Computer-readable media 1014 provides data storage mechanisms to store the device data 1004, as well as various device applications 1018 and any other types of information and/or data related to operational aspects of device 1000. For example, an operating system 1020 can be maintained as a computer application with the computer-readable media 1014 and executed on processors 1010. The device applications 1018 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 1018 also include any system components or modules to implement embodiments of the techniques for data synchronization policies described herein.

In this example, the device applications 1018 include an interface application 1022 and a gesture-capture driver 1024 that are shown as software modules and/or computer applications. The gesture-capture driver 1024 is representative of software that is used to provide an interface with a device configured to capture a gesture, such as a touchscreen, track pad, camera, and so on. Alternatively or in addition, the interface application 1022 and the gesture-capture driver 1024 can be implemented as hardware, software, firmware, or any combination thereof.

Device 1000 also includes an audio and/or video input-output system 1026 that provides audio data to an audio system 1028 and/or provides video data to a display system 1030. The audio system 1028 and/or the display system 1030 can include any devices that process, display, and/or otherwise render audio, video, and image data. Video signals and audio signals can be communicated from device 1000 to an audio device and/or to a display device via an RF (radio frequency) link, S-video link, composite video link, component video link, DVI (digital video interface), analog audio connection, or other similar communication link. In an embodiment, the audio system 1028 and/or the display system 1030 are implemented as external components to device 1000. Alternatively, the audio system 1028 and/or the display system 1030 are implemented as integrated components of example device 1000.

CONCLUSION

Techniques for data synchronization policies are described. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A system, comprising:
one or more processors;
one or more computer-readable storage media storing computer-executable instructions that are executable by the one or more or more processors, the computer-executable instructions including:
a synchronization policy manager module configured to:
receive and aggregate a set of synchronization policies for devices in a synchronization environment, including a particular synchronization policy that specifies different data synchronization frequencies for different individual sync participants based on a number of sync participants in the synchronization environment and on one or more device attributes of one or more instances of the devices; and
synchronize the set of synchronization policies to multiple devices in the synchronization environment; and
a communication device configured to transmit one or more data synchronization instructions to the multiple devices based on the set of synchronization policies to cause data to be synchronized at a particular device of the multiple devices at a different frequency than a different device of the multiple devices and based on the particular synchronization policy.

2. A method as described in claim 1, wherein the one or more synchronization policies specify that a frequency with which data synchronization operations are performed is determined based on a number of the devices that are active in the synchronization environment.

3. A method as described in claim 1, wherein at least one of the synchronization policies specifies that high interest data is to be synced to one or more of the devices more frequently than other types of data.

4. A method as described in claim 1, wherein at least one of the synchronization policies is based on a device type for one or more of the devices.

5. A method as described in claim 1, wherein the synchronization policies are managed by a synchronization service external to the devices, and wherein at least one of the synchronization policies specifies that the devices are to periodically query the synchronization service for changes to the synchronization policies or query the synchronization service for changes to the synchronization policies in response to a notification from the synchronization service.

6. A method as described in claim 1, wherein the data sync environment is associated with at least a first service level and a second service level, and wherein at least one of the synchronization policies specifies more frequent data synchronization operations for a device subscribing to the first service level than for a device subscribing to the second service level.

7. A method as described in claim 1, wherein at least one of the synchronization policies specifies, for a user with more devices registered in the sync environment than for a user with fewer devices registered in the synchronization environment, at least one of: more frequent data synchronization operations, a higher data bandwidth allotment, a larger amount of data per synchronization operation, or a larger amount of data stored by a synchronization service.

8. A method as described in claim 1, further comprising:
ascertaining that at least one of the devices is subscribing to a service data collection of multiple service data collections available in the synchronization environment,
wherein said performing comprises synchronizing data between the service data collection and a client data collection on the at least one device, and wherein at least one of the synchronization policies specifies a maximum data storage amount for one or more of the service data collections.

9. A method as described in claim 8, further comprising discontinuing synchronization of the service data collection to the at least one device in response to one of a user unsubscribing from the service data collection or an expiration of a subscription to the service data collection.

10. A method as described in claim 9, further comprising deleting the service data collection without deleting a corresponding client data collection in response to ascertaining that no devices are subscribing to the service data collection.

11. A method as described in claim 1, further comprising presenting a sync user interface via one of the devices that enables one or more synchronization parameters to be specified for multiple of the devices.

12. A method as described in claim 1, wherein the synchronization environment is associated with a synchronization service, and wherein the method further comprises discontinuing data synchronization to one or more of the devices in response to an expiration of a registration of the one or more devices with the synchronization service.

13. A computer-implemented method, comprising:
receiving an indication of a change associated with one or more device attributes of one or more instances of a device in a synchronization environment;
notifying multiple different devices in the synchronization environment of the change in the one or more device attributes such that the multiple different devices can change one or more synchronization policy values based on the change in the one or more device attributes, the synchronization policies specifying parameters for data synchronization operations in the synchronization environment; and
performing one or more data synchronization operations in the synchronization environment based on the change in the one or more synchronization policy values.

14. A method as described in claim 13, wherein the change in the one or more device attributes comprises an activation of the device into the synchronization environment or a disconnection of the device from the synchronization environment.

15. A method as described in claim 13, wherein said performing comprises:
increasing the frequency of data synchronization operations if the change in the one or more device attributes comprises an activation of the device into the synchronization environment; or
decreasing the frequency of data synchronization operations if the change in the one or more device attributes comprises a disconnection of the device from the synchronization environment.

16. A method as described in claim 13, wherein said change in the one or more device attributes comprises a new geographic location for the device, and wherein the one or more data synchronization operations are performed based on the new geographic location.

17. A computer-implemented method, comprising:
ascertaining that a device subscribes to a data collection of multiple data collections available to be synchronized to the device, the data collections individually corresponding to a particular category of data and at least one of the data collections corresponding to a user-designated category;

synchronizing data from the data collection to the device at a frequency determined at least in part by network resources available to the device; and discontinuing synchronization of the data collection to the device in response to one of a user unsubscribing from the data collection or an expiration of a subscription to the data collection for the device.

18. A method as described in claim 17, wherein said unsubscribing is responsive to the user uninstalling an application associated with the data collection.

19. A method as described in claim 18, wherein the sync user interface is further configured to enable a user to renew a subscription to one or more other data collections.

20. A method as described in claim 17, wherein the data collection is stored at a synchronization service, and wherein the method further comprises deleting the data collection from the synchronization service in response to ascertaining that no devices are subscribing to the data collection.

* * * * *